Sept. 10, 1946.  G. H. SCHAUWEKER  2,407,518
EYE PROTECTION DEVICE
Filed Dec. 18, 1943
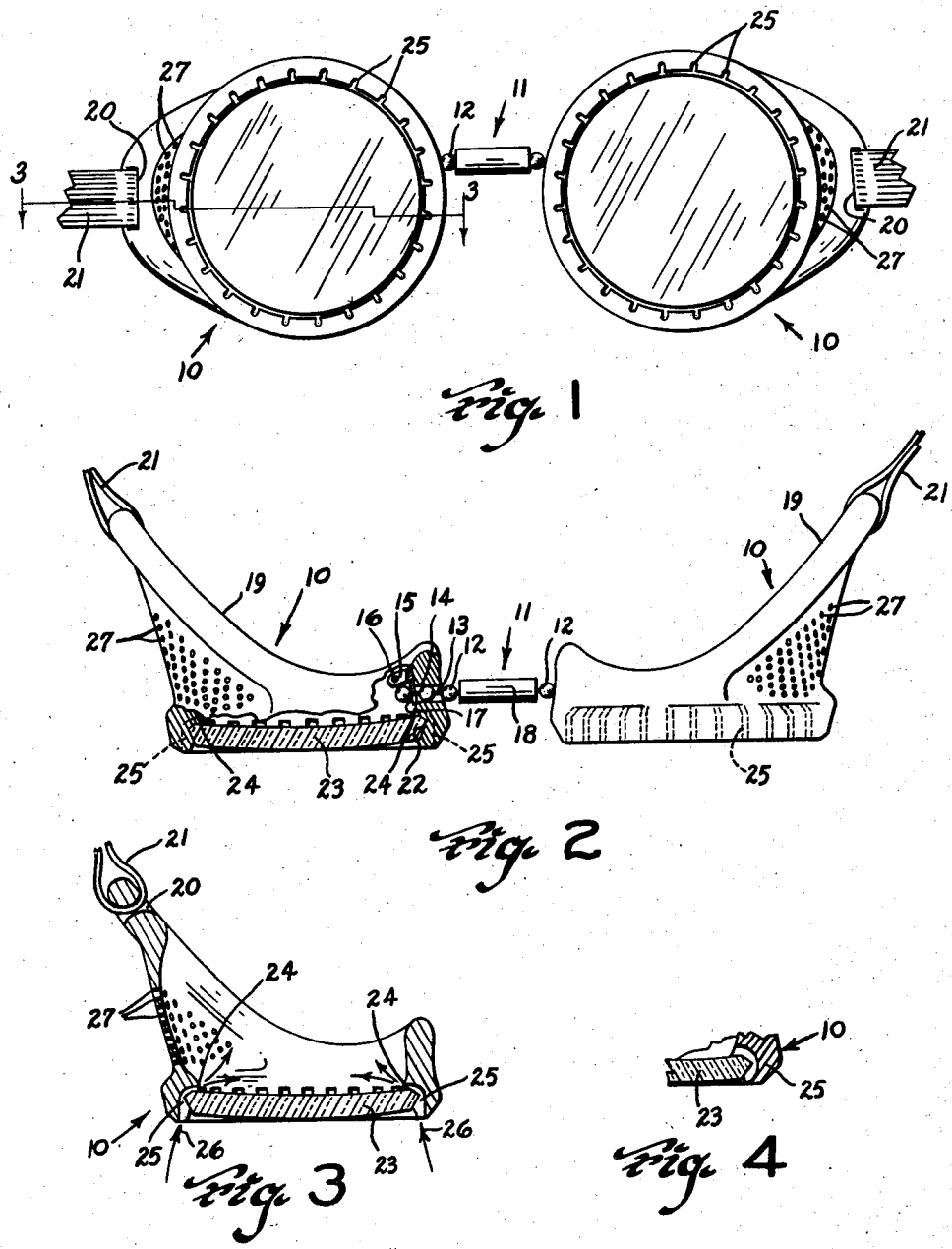
INVENTOR
GEORGE H. SCHAUWEKER
BY
ATTORNEY Patented Sept. 10, 1946

2,407,518

UNITED STATES PATENT OFFICE 2,407,518

EYE PROTECTION DEVICE

George H. Schauweker, Southbridge, Mass., assignor to American Optical Company, Southbridge, Mass., a voluntary association of Massachusetts Application December 18, 1943, Serial No. 514,774

3 Claims. (Cl. 2—14)

This invention relates to improvements in eye protection devices and has particular reference to novel means and method of forming a goggle and of providing said goggle with ventilation means.

One of the principal objects of the invention is to provide novel means and method of forming a goggle of the above nature which will be economical and simple to manufacture with the major parts of said goggle being formed in integral relation with each other.

Another object of the invention is to provide novel means and methods of inserting and securing leases in the goggle eyecups without the use of retaining rings or other separable parts.

Another object is to provide ventilation means integrally formed in the eyecups adjacent the lens receiving grooves to prevent the lenses from fogging.

Another object is to provide ventilation means of the above nature whereby the edge of the lenses will form a portion of the walls of the ventilating apertures.

Another object is to provide further ventilating means for the eyecups which will eliminate the use of other separable parts such as metal screens or apertured plates.

Other objects and advantages of the invention will become apparent from the following description taken in connection with the accompanying drawing and it will be apparent that many changes may be made in the details of construction, arrangement of parts and methods shown and described, without departing from the spirit of the invention as expressed in the accompanying claims.

I, therefore, do not wish to be limited to the exact details and arrangements shown and described as the preferred form only has been given by way of illustration.

Referring to the drawing:

Fig. 1 is a front view of the goggle embodying the invention.

Fig. 2 is a top plan view of the goggle shown in Fig. 1 with a part thereof shown in section.

Fig. 3 is a fragmentary sectional view of the goggle taken on line 3—3 of Fig. 1.

Fig. 4 is a fragmentary sectional view of a modified form of the invention.

In the past with goggles of this nature the lenses were usually supported in position in the eyecups by means of retaining rings. These rings were provided with a portion which was adapted to overlie a portion of the eyecups and to be threadedly connected thereto. These retaining rings were provided with an inner annular lip which contacted the lenses and held them in assembled relation with the eyecups against a shoulder formed on the inner periphery of said eyecups.

It will be apparent that constructions of this nature were costly to manufacture, as they embodied several separate parts which required numerous operations during the manufacture thereof.

Another difficulty encountered with constructions of this nature is that after the lenses have been frequently changed or replaced, the threaded portions of the eyecups and retaining rings have a tendency to wear, thus making it impossible to properly support the lenses within the eyecups, and therefore necessitating the replacement of the eyecups or retaining rings.

In goggles of this nature a large variety of ventilating means have been used in the past, all of which required the use of separable parts which were adapted to be attached to different portions of the eyecups. It is quite apparent that separable parts such as metal screens, apertured plates, raised louvers, etc. would greatly increase the cost of manufacture of the goggles.

It, therefore, is one of the primary objects of the present invention to overcome the above difficulties by forming all of the required parts in integral relation with each other.

Referring more particularly to the drawing wherein like characters of reference designate the parts throughout the several views, the goggle embodying the invention, as shown in Fig. 1 to Fig. 4 inclusive, comprises broadly a pair of moulded eyecups 10, of any suitable mouldable material such as cellulose acetate, cellulose nitrate, methyl-methacrylate, artificial resins, etc.

The eyecups 10 are connected together at their nasal sides by means of a flexible bridge member 11. The bridge member 11 comprises a plurality of hollow ball members 12, which are connected together by loose link members 13, which are headed over on the inside of the hollow balls 12, so that the series of hollow balls 12 and the link members 13 will have the action of a link chain. As shown in Fig. 2, the eyecups 10 are provided with suitable openings 14 at their nasal sides through which the ends of the bridge member 11 are inserted. The bridge member 11 is held in adjusted relation with the eyecups by means of the latches 15 which are pivotally attached to the inner walls of the eyecups by means of pins or the like 16. The latch members 15 are provided with slotted ends 17 which are adapted to straddle any one of the link members 13 to secure the bridge member to the eyecups in adjusted relation therewith.

A tubular member 18 of soft rubber or any other suitable soft heat resisting material may be slipped over the balls 12 to provide a comfortable contact between the bridge member and the nose of the wearer.

The eyecups 10 are preferably moulded with a face formed contacting portion 19 which is adapted to fit snugly with the contour of the face. The eyecups are provided at their extreme outer ends with elongated slots 20 which are adapted to receive a suitable headband 21 for supporting the eyecups upon the face of the wearer.

The eyecups 10 are provided with lens receiving grooves 22 formed about the inner periphery of the eyecups opposite the face contacting edge. The lens receiving grooves 22 are shaped to substantially the shape of the bevelled edges of the lenses and are adapted to receive the lenses 23, which may be of any desired type such as clear, colored lenses, protective lenses, etc.

The lenses 23 are inserted in the lens grooves 22, by heating the eyecups 10 adjacent the lens grooves an amount sufficient to soften the material and allow the eyecups to be stretched. The lenses 23 are then snapped into place. After the lenses have been positioned within the lens grooves 22 the eyecups are allowed to cool thereby causing the material to shrink about the edges of the lenses. It will be seen that with this method the lenses 23 will be held securely within the eyecups 22. When the lenses are to be changed, or replaced, the eyecups are heated adjacent the lens grooves, and the lenses may be readily snapped out and new lenses inserted.

The eyecups 10 are each provided with an internal lip or shoulder 24 adjacent the groove 22 to form a backing support for the lenses. This will prevent the lenses from being forced inwardly by a blow or the like against the said lenses.

To prevent fogging of the lenses, suitable ventilation means have been provided in the form of a plurality of grooves or recesses 25, said grooves being spaced about the inner portion of the eyecups adjacent the lens grooves, as best shown in Fig. 3. The grooves 25 are adapted to be mouldably formed in the eyecups when the eyecups themselves are moulded or may thereafter be cut if desired.

It is particularly pointed out that the spaced grooves or recesses 25 are so formed that the base of each extends inwardly, from the front edge of the eyecup, about the contour edge of the lens below the depth of the lens groove 22 to provide a space between said lens edge and the base, and thence turns inwardly below the plane of the lip or shoulder 24 substantially in the direction of the plane of the inner surface of the lens. The depth to which the grooves or recesses 25 are formed is controlled so that sufficient clearance about the contour edge of the lens will exist after the lens has been secured within the groove 22. The internal lip or shoulder 24 increases the length of the grooves in the direction of the plane of the lens and functions as shunt means for deflecting air entering the grooves in the direction of the plane of the inner surface of the lens.

It will be seen that when the lenses 23 are inserted in the eyecups 10 that the bevelled edges of the lenses 23, adjacent the ventilating grooves 25 and in cooperation therewith, will form ventilation openings whereby air will flow from exteriorly of the eyecups about the bevelled edges of the lenses into the interior of the said eyecups, as shown by the arrows 26.

It will be seen that the air thus admitted into the interior of the eyecups will be directed substantially across the inner surfaces of the lenses to insure a like temperature adjacent the inner surfaces of the lenses as the temperature on the outer surfaces of the lenses.

Further ventilation means have been provided in the eyecups 10 to insure comfort to the eyes, and those parts of the face of the wearer that are confined within the said eyecups. This ventilation means comprises a plurality of openings 27 located in the rearwardly extending side portions of the eyecups between the lens receiving grooves and the headband attachment means. The said openings 27 may be formed when the eyecups are moulded or may be formed by drilling, piercing or the like after said eyecups are moulded.

Fig. 4 shows a modification of the ventilating means whereby the ventilating grooves 25 adjacent the lenses 23 may be formed by milling or the like after the eyecups are mouldably formed.

The eyecups 10, although described above as being formed of plastic material which may be heated and stretched in the vicinity of the lens receiving groove, may be initially molded to a size greater than the diameter of the lens in the vicinity of the lens receiving groove. With the latter arrangement, the eyecups are formed of a plastic material which may be injection molded whereby the material of the eyecup, when removed from the mold, will have an internal strain which upon subsequent heating may be relieved causing the material of the eyecups to shrink. By forming the eyecup to an initially larger size than the lens, it is quite apparent that the lens may be positioned in alignment with the lens receiving groove, the assembly then heated in amount sufficient to relieve the internal strain in the material to cause said material to shrink about the contour edge of the lens and thereafter allowed to cool to retain the lens in position in the groove. In this manner, the initial step of heating and stretching the eyecup to permit insertion of the lens in the lens groove is not necessary.

As a further modification, the only part of the eyecup having the lens receiving groove therein may be formed initially larger in diameter than the lens so that only said part of the eyecup need be heated and permitted to shrink.

With the latter arrangement, the part of the eyecup shaped to fit the face may be formed to a definitely controlled size during the injection molding.

In the case where the entire eyecup is injection molded to a size larger than that required for the final eyecup, care must be exercised in controlling the subsequent shrinking whereby the final size and shape of the eyecup will be that required to fit the wearer. This may be controlled by forming the eyecup to an initial size and with a given amount of strain therein so that when heated to relieve said strain, the eyecup will assume the desired final shape and size required.

From the foregoing description, it will be seen that simple, efficient, and economical means and methods have been provided for accomplishing all the objects and advantages of the invention.

Having described my invention, I claim:

1. In a device of the character described a pair of eyecups formed of heat expandable plastic material, each of said eyecups having an integral edge portion shaped substantially to fit the face of the wearer and having an opposed integral portion formed with an inner lens receiving groove and a plurality of radially disposed spaced grooves extending transversely of the lens receiving groove with the said spaced grooves being of a greater depth than the depth of the lens receiving groove and a lens located within said lens receiving groove with the contour edge thereof in intimate engagement with said groove between the respective transversely extending grooves, with the base of the respective transversely extending grooves spaced from the edge of the lens and with the forward circumferential edge of the portion having the lens receiving groove therein being of a circumferential dimension less than the greatest circumferential dimension of the lens, the integral side wall on the temporal side of each eyecup being of a thickness much less than the thickness of the remaining side walls of the eyecup and having a plurality of spaced openings extending therethrough.

2. In a device of the character described a pair of eyecups formed of heat expandable plastic material, each of said eyecups having an integral edge portion shaped substantially to fit the face of the wearer and having an opposed integral portion of increased thickness formed with an inner bevelled lens receiving groove therein and a plurality of radially disposed spaced grooves extending transversely of the lens receiving groove with the said spaced grooves being of a greater depth than the depth of the lens receiving groove and a lens located within said lens receiving groove with the contour edge thereof in intimate engagement with said groove between the respective transversely extending grooves, with the base of the respective transversely extending grooves spaced from the edge of the lens and with the forward circumferential edge of the portion having the lens receiving groove therein being of a circumferential dimension less than the greatest circumferential dimension of the lens, the integral side wall on the temporal side of each eyecup being of a thickness much less than the thickness of the remaining side walls of the eyecup and having a plurality of spaced openings extending therethrough.

3. In a device of the character described a pair of eyecups formed of heat expandable plastic material, each of said eyecups having an integral edge portion shaped substantially to fit the face of the wearer and having an opposed integral portion formed with an inner lens receiving groove and a plurality of radially disposed spaced grooves extending transversely of the lens receiving groove with the said spaced grooves being of a greater depth than the depth of the lens receiving groove and a lens located within said lens receiving groove with the contour edge thereof in intimate engagement with said groove between the respective transversely extending grooves, with the base of the respective transversely extending grooves spaced from the edge of the lens and with the forward circumferential edge of the portion having the lens receiving groove therein being of a circumferential dimension less than the greatest circumferential dimension of the lens, the integral side wall on the temporal side of each eyecup being of a thickness much less than the thickness of the remaining side walls of the eyecup and having a plurality of spaced openings extending therethrough, said integral edge portion shaped substantially to fit the face of the wearer having a slotted headband receiving portion adjacent the temporal sides thereof.

GEORGE H. SCHAUWEKER.